United States Patent
Hwang

(10) Patent No.: US 8,490,736 B2
(45) Date of Patent: Jul. 23, 2013

(54) ACTIVE HOOD SYSTEM FOR VEHICLE

(75) Inventor: In Hwang, Gyeongsangbuk-do (KR)

(73) Assignee: Hyundai Motor Company, Seoul (KR)

( * ) Notice: Subject to any disclaimer, the term of this patent is extended or adjusted under 35 U.S.C. 154(b) by 107 days.

(21) Appl. No.: 13/323,685

(22) Filed: Dec. 12, 2011

(65) Prior Publication Data

US 2013/0020141 A1    Jan. 24, 2013

(30) Foreign Application Priority Data

Jul. 18, 2011 (KR) .................. 10-2011-0070739

(51) Int. Cl.
*B60R 21/34* (2011.01)
(52) U.S. Cl.
USPC ............... 180/274; 180/69.21; 296/187.04
(58) Field of Classification Search
USPC . 180/69.2, 69.21, 271, 274, 281; 296/187.04, 296/193.11; 292/92, 95, 128
See application file for complete search history.

(56) References Cited

U.S. PATENT DOCUMENTS

| | | | |
|---|---|---|---|
| 6,330,734 B1 * | 12/2001 | Cho | 16/376 |
| 7,073,846 B2 * | 7/2006 | Borg et al. | 296/187.13 |
| 7,195,090 B2 | 3/2007 | Parks et al. | |
| 7,303,040 B2 | 12/2007 | Green et al. | |
| 7,559,399 B2 * | 7/2009 | Lewis et al. | 180/274 |
| 7,828,100 B2 * | 11/2010 | Polz et al. | 180/69.21 |
| 7,896,122 B2 * | 3/2011 | Borg et al. | 180/274 |
| 7,931,111 B2 * | 4/2011 | Kim et al. | 180/274 |
| 7,946,376 B2 * | 5/2011 | Hayashi et al. | 180/274 |
| 8,083,270 B2 * | 12/2011 | Hwang | 292/128 |
| 8,162,093 B2 * | 4/2012 | Scheuch et al. | 180/274 |
| 2006/0102402 A1 * | 5/2006 | Birk et al. | 180/89.17 |
| 2006/0213709 A1 * | 9/2006 | Yamaguchi et al. | 180/69.21 |
| 2009/0288271 A1 | 11/2009 | Kmieciak et al. | |

FOREIGN PATENT DOCUMENTS

| | | |
|---|---|---|
| KR | 10-0726165 | 3/2007 |
| KR | 10-2008-0017726 | 2/2008 |
| KR | 10-2010-0055932 | 5/2010 |

\* cited by examiner

*Primary Examiner* — Ruth Ilan
*Assistant Examiner* — Darlene P Condra
(74) *Attorney, Agent, or Firm* — Edwards Wildman Palmer LLP; Peter F. Corless

(57) ABSTRACT

An active hood system for a vehicle allows a user to easily restore the positions of an actuator and a hood with little force after a pedestrian collision. The active hood system includes: a hinge assembly mounted at rear sides of a hood; and an actuator for supporting the hinge assembly and lifting the hinge assembly as well as lifting the hood through the hinge assembly. The active hood system further includes a restoration link, wherein its top and bottom ends are hinged to a hinge arm of the hinge assembly fixed to the hood, and to a fixing point of the actuator, respectively, so the restoration link is rotated in cooperation with the hood, and wherein when the hood is pressed downward to restore the actuator and the hood, the restoration link is rotated such that the restoration link reduces the force required for restoring the actuator and hood.

7 Claims, 6 Drawing Sheets

ACTIVE HOOD SYSTEM FOR VEHICLE

CROSS-REFERENCE TO RELATED APPLICATION

This application claims under 35 U.S.C. §119(a) the benefit of Korean Patent Application No. 10-2011-0070739 filed Jul. 18, 2011, the entire contents of which are incorporated herein by reference.

BACKGROUND (a) Technical Field

The present invention relates to an active hood system for a vehicle. More particularly, the present invention relates to an active hood system for a vehicle which allows a user to easily restore the positions of an actuator and a hood operated at the time of a pedestrian collision with little force.

(b) Background Art

In general, a vehicle has an engine compartment provided at the front part thereof, wherein the engine compartment is opened or closed by a hood.

The hood is a part adapted to shut off engine noise by shielding the engine compartment as well as to open or close the engine compartment, in which the hood is connected to the top of the engine compartment generally at the left and right sides of the rear end thereof through hinge assemblies in such a manner that the hood can be rotated about the hinge assemblies to open or close the engine compartment.

However, such a hood is known as a part inflicting a heavy injury upon a pedestrian at the time of a pedestrian collision. Thus, an active hood system is recently applied to such a hood, so that a space capable of absorbing the pedestrian's impact energy can be secured between the hood and the engine compartment in a pedestrian collision accident.

The active hood system is a system for lifting a hood so as to protect a pedestrian at the time of a pedestrian collision, and serves as a kind of a pedestrian-protection safety device which can reduce the pedestrian's injury index as well as absorb the pedestrian's shock in a pedestrian collision accident.

In a conventional active hood system, if a sensor mounted on a front bumper senses a pedestrian collision when a pedestrian collides against the front bumper, a controller operates an actuator in accordance with a sensing signal of the sensor to lift the rear end of the hood, so that a shock-absorbing space can be secured between the hood and the engine compartment.

At this time, if the controller receives the sensing signal from the sensor and drives the actuator, a hinge assembly is lifted by the actuator as it is driven, and at the same time, the rear end of the hood, to which the hinge assembly is connected, is lifted, thereby pushing up the pedestrian to absorb the pedestrian's shock.

However, such a conventional active hood system has a problem as follows.

Various actuators are applied to such an active hood system to lift the rear end of a hood, in which after the active hood system is operated, it is impossible for a user to manually restore the actuators to the original positions thereof, i.e. to the state prior to operation. That is, due to the excessive force typically exerted by springs that have raised the rear end of the hood after the actuators were operated, it is difficult for a user to manually lower and close the lifted hood, which deteriorates the user's convenience.

Such a problem will be described with reference to FIG. 1 which shows a construction of a conventional hinge assembly, wherein as shown in the drawing, an actuator 20 has springs 21 exerting a strong spring force to raise a considerably heavy hood at the time of a pedestrian collision, and a hinge assembly 10 having a four-bar link mechanism is provided between a hood (not shown) and the actuator 20.

The hinge assembly 10 includes a hinge arm 11 fixed to the hood, and two links 12 and 13 provided between and connected to the hinge arm 11 and the actuator 20, in which the links 12 and 13 are lifted and rotated as the actuator 20 is being driven, which causes the rear end of the hood to be lifted, and at the same time, the actuator 20 is lifted, which causes the hinge arm 11 and links 12 and 13 to be pushed upward.

In order to restore the actuator after the actuator was operated as described above, it is necessary to lower the hood so that the springs can be compressed. However, due to the excessive spring force, it is impossible for the user to directly lower the hood to compress the springs and at the same time to restore the position of the actuator. Consequently, the actuator can be restored only in a vehicle after-service (AS) center or a vehicle repair center.

As a result, after the pedestrian collision and the operation of the active hood system, the vehicle should be moved to such a vehicle AS center or a vehicle repair center in a state in which the hood is deployed, that is the rear end of the hood is raised, and if the vehicle is driven in such a state, the possibility of accident occurrence is increased.

The above information disclosed in this Background section is only for enhancement of understanding of the background of the invention and therefore it may contain information that does not form the prior art that is already known in this country to a person of ordinary skill in the art.

SUMMARY OF THE DISCLOSURE

The present invention provides an active hood system for a vehicle which allows a user to restore an actuator operated at the time of a pedestrian collision with little force.

In one aspect, the present invention provides an active hood system for a vehicle including: a hinge assembly mounted at each of the left and right sides of a hood to provide a hinge point at the time of opening or closing the hood; and an actuator for supporting and lifting the hinge assembly as well as for lifting the hood through the hinge assembly, the active hood system further including: a restoration link having top and bottom ends, wherein the top and bottom ends are hinged to a hinge arm of the hinge assembly fixed to the hood, and to a fixing point of the actuator, respectively, so that the restoration link can be rotated in cooperation with the hood, and wherein when the hood is pressed downward at the time of restoring the actuator and the hood, the restoration link is rotated about its bottom end-hinged part, at which the bottom end of the restoration link is connected to the fixing point of the actuator, whereby the restoration links can reduce the user's force required for restoring the actuator and the hood.

In an exemplary embodiment, the restoration link may be installed to interconnect the hinge arm and the fixing point of the actuator in an inclined direction.

In another exemplary embodiment, with reference to the front and the rear of the vehicle body, the restoration link may be hinged to the rear end of the hinge arm at its top end, and to the front fixing point of the actuator at its bottom end.

In still another exemplary embodiment, the top end of the restoration link may be hinged to a position behind one or more top link ends-hinged parts of the hinge assembly for interconnecting the hinge arm and the actuator.

In yet another exemplary embodiment, the bottom end of the restoration link may be hinged to the body of the actuator below and ahead of one or more bottom link ends-hinged parts of the hinge assembly for interconnecting the hinge arm and the actuator.

In accordance with the present invention as described above, if a user presses the front end of the hood of a vehicle in a state in which the actuator was operated and lifted for protecting a pedestrian at the time of a pedestrian collision, the restoration link serves as a lever, whereby the positions of the actuator and the hood can be lowered and restored with less force.

Consequently, the user can easily restore the positions of the actuator and the hood, and can perform self-maintenance for a vehicle, whereby the user's convenience and merchantability of the vehicle can be enhanced.

In addition, since it is not necessary to drive the vehicle in a state in which the hood is raised upward for restoration after the active hood system was operated, it is possible to remove the possibility of accident occurrence after the operation of the active hood system.

BRIEF DESCRIPTION OF THE DRAWINGS

The above and other features of the present invention will now be described in detail with reference to certain exemplary embodiments thereof illustrated in the accompanying drawings which are given hereinbelow by way of illustration only, and thus are not limitative of the present invention, and wherein:

FIGS. 4 and 5 show a process of restoring the actuator in the active hood system in accordance with the embodiment, in which FIG. 4 shows a state in which the hood is opened for restoration, and FIG. 5 shows a state in which a restoration link connected to the actuator at the time of restoration.

DETAILED DESCRIPTION

Hereinafter reference will now be made in detail to various embodiments of the present invention, examples of which are illustrated in the accompanying drawings and described below. While the invention will be described in conjunction with exemplary embodiments, it will be understood that the present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

In addition, it is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

The present invention relates to an active hood system for a vehicle. In particular, the present invention relates to an active hood system which allows a user to easily restore the positions of an actuator and a hood operated at the time of a pedestrian collision with little force.

In particular, the inventive active hood system has a main characteristic in that it further includes a restoration link which can assist a user to readily lower an actuator and a hood in the state in which the actuator was operated by serving as a lever when a user presses the front end of the hood.

Figure 1:
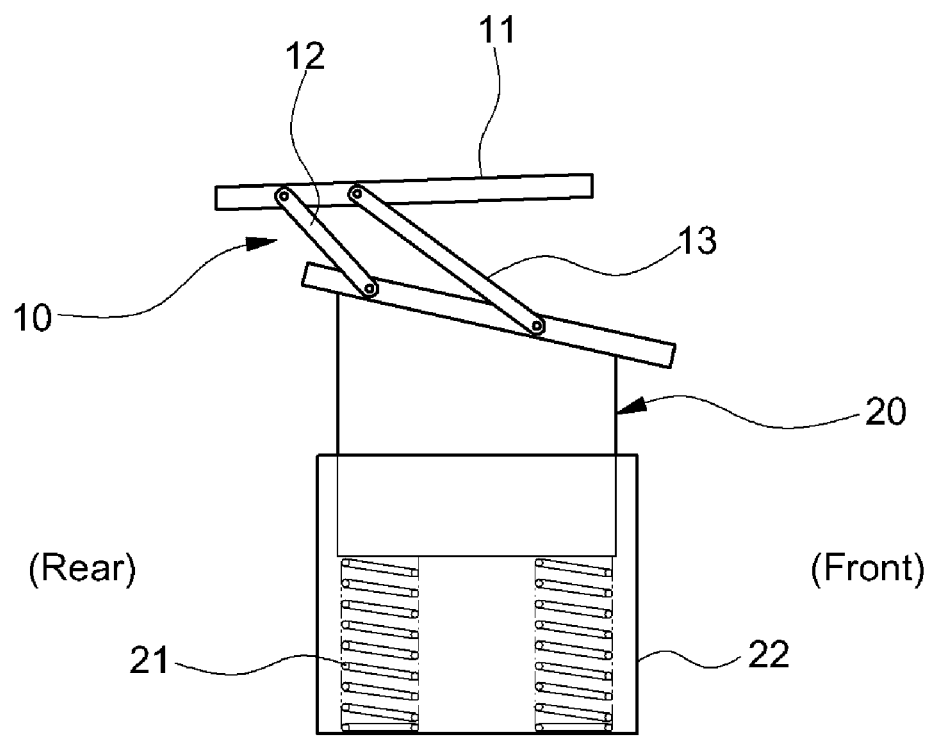
FIG. 1 is a schematic view showing a hinge assembly of a conventional active hood system.
Figure 2:
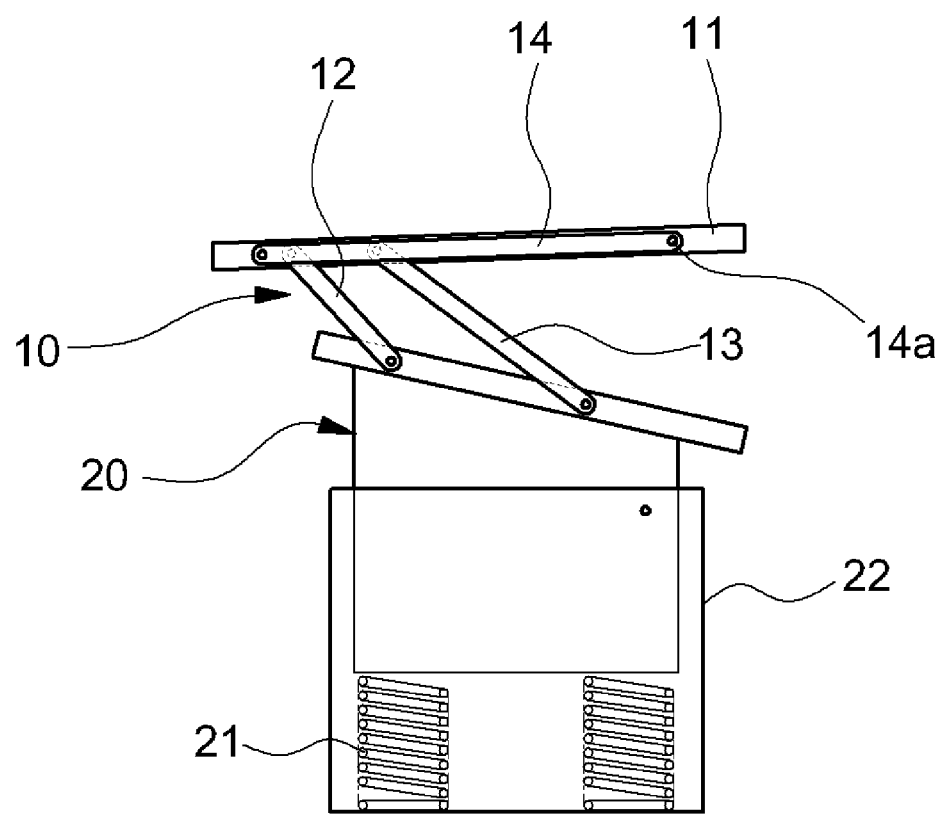
FIG. 2 shows a construction of an active hood system in accordance with an embodiment of the present invention in the state prior to the operation of an actuator.
Figure 3:
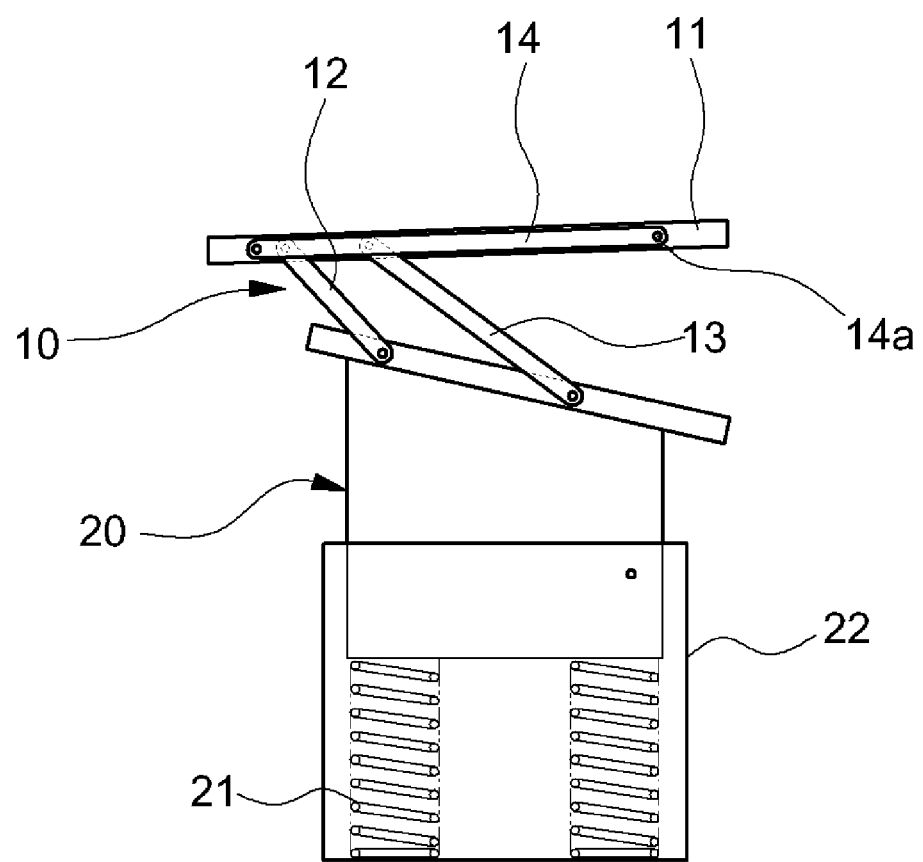
FIG. 3 shows the conditions of the actuator and the hinge assembly of the system operated at the time of a pedestrian collision in the active hood system in accordance with the embodiment.

FIG. 2 shows a construction of an active hood system in accordance with an embodiment of the present invention in the state prior to the operation of an actuator, and FIG. 3 shows the conditions of the actuator and the hinge assembly of the system operated at the time of a pedestrian collision in the active hood system in accordance with the embodiment.

Figure 4:
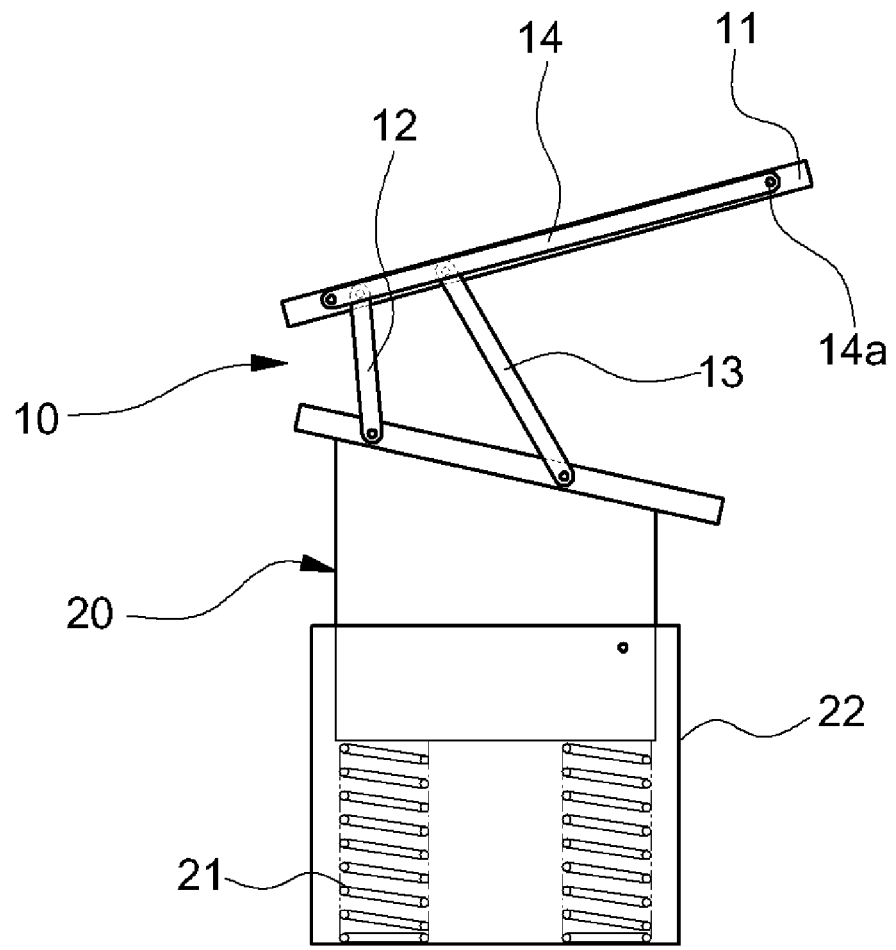
Figure 5:
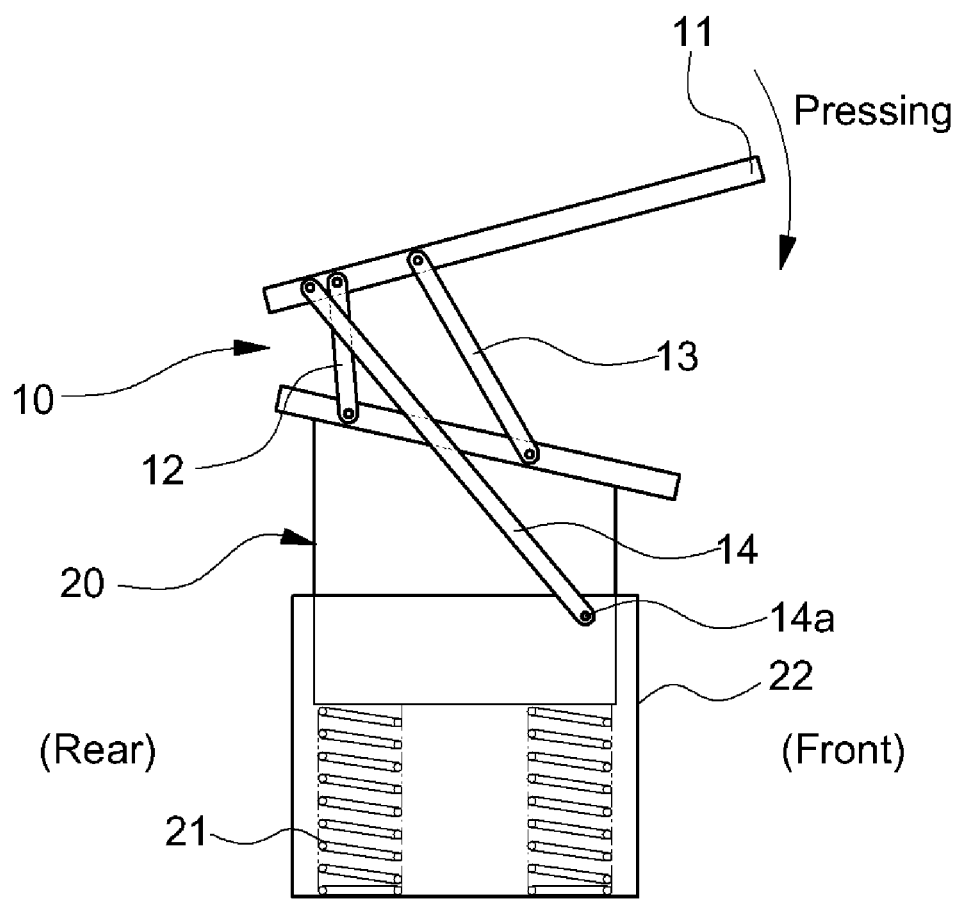

In addition, FIGS. 4 and 5 show a process of restoring the actuator in the active hood system in accordance with the embodiment, in which FIG. 4 shows a state in which the hood is opened for restoration, and FIG. 5 shows a state in which a restoration link is connected to the actuator at the time of restoration.

At first, the active hood system includes: a hinge assembly 10 mounted at each of the left and right sides of the rear end of a hood to provide a hinge point at the time of opening or closing the hood; an actuator 20 mounted to be capable of supporting and lifting the hinge assembly 10; a pedestrian collision sensing sensor (not shown) mounted on the bumper of the vehicle; and a controller (not shown) for driving the actuator by receiving a sensing signal from the pedestrian collision sensing sensor.

Figure 6:
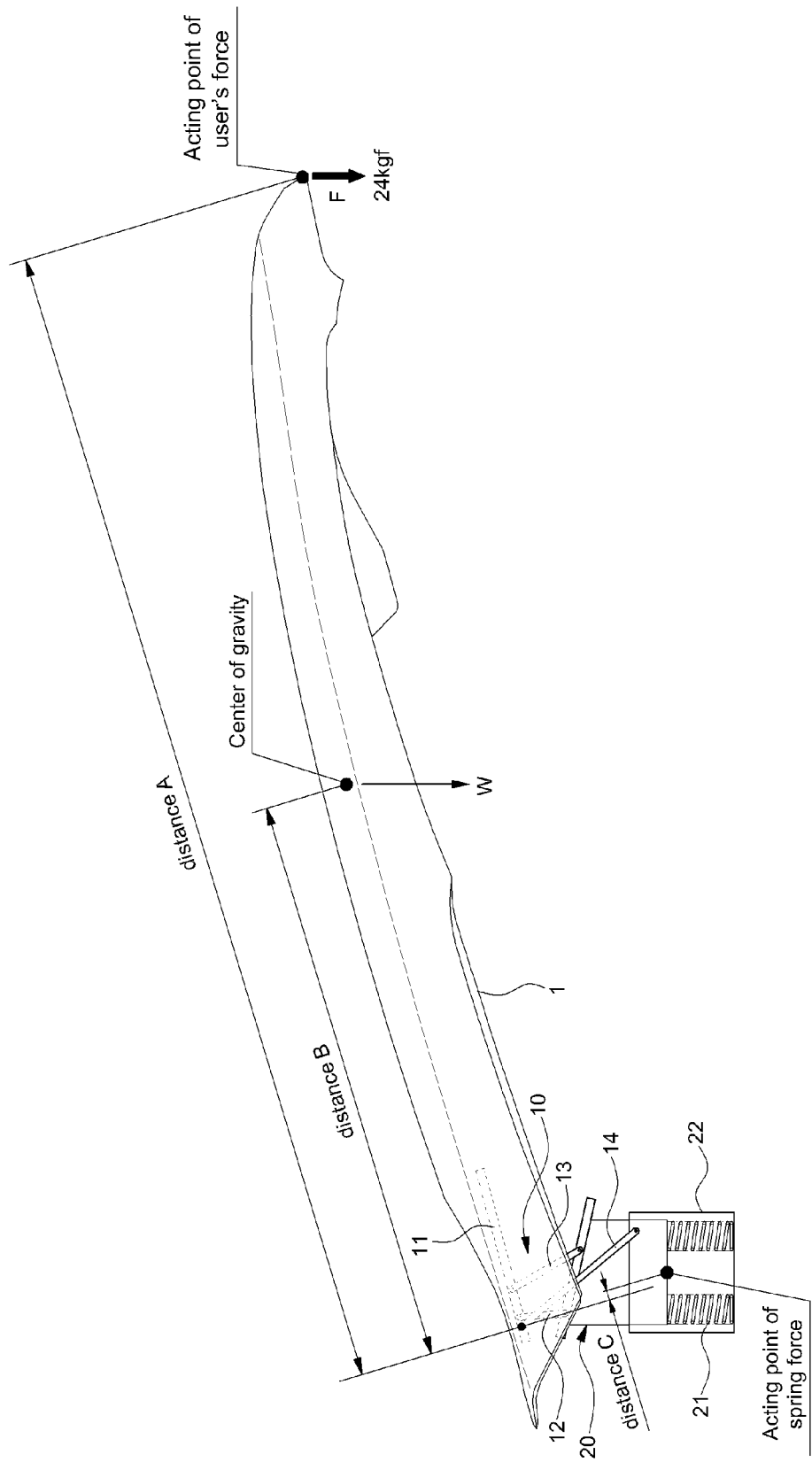
FIG. 6 is a view for describing a user's restoration force in the inventive active hood system.

Here, the hinge assembly 10 includes a hinge arm 11 fixedly mounted on the hood (indicated by reference numeral 1 on FIG. 6), and first and second links 12 and 13 provided between and hinged to the hinge arm 11 and the actuator 20 at the opposite ends thereof.

With this construction, if the actuator 20 is operated by the controller that receives a sensing signal from the pedestrian collision sensing sensor, the springs 21 are tensioned and at the same time the actuator 20 is lifted, thereby raising the hinge assembly 10 upward. Consequently, the rear end is lifted simultaneously when the hinge assembly 10 is raised upward.

FIG. 3 shows a state in which the actuator 20 is operated and the hinge assembly 10 is lifted (i.e., the rear end of the hood is lifted), wherein the existing 4-bar link elements of the hinge assembly 10, i.e. the hinge arm 11, the first link 12 and the second link 13 are simultaneously lifted due to the operation of the actuator 20, thereby raising the hood.

Meanwhile, the hinge assembly 10 in the inventive active hood system is additionally provided with a restoration link 14 wherein the restoration link 14 reduces, by lever principle, the restoration force to be exerted by the user when the hood is pressed downward for the purpose of restoring the actuator 20 and the hood.

The restoration link 14 is a member that allows the positions of the actuator and the hood to be readily restored when the user directly presses the front end of the hood in the state in which the actuator 20 was operated, wherein the restoration link 14 lowers the hinge arm 11, the first link 12 and the second link 13 concurrently by lever principle while it is being rotated in cooperation with the descent of the hood.

Such a restoration link 14 is provided to interconnect the hinge arm 11 and the actuator 20. In particular, the restoration link 14 is provided in such a manner that at the time of restoration, the opposite ends of the restoration link 14 are rotatably hinged to the hinge arm 11 and the actuator 20, respectively, and with reference to the front and the rear of the vehicle body and the hood, one end (top end) of the restoration link 14 is hinged to the rear end of the hinge arm 11, and the other end (bottom end) is hinged to the fixed point of the actuator 20.

At the time of restoration after the operation of the actuator 20, the front end of the hood is pressed downward in the state in which the hood is raised upward to be opened (see FIG. 6), wherein the condition of the hinge assembly 10 prior to pressing the front end of the hood in the same state is shown in FIG. 4.

In addition, at the time of restoration, it is possible to use the restoration link 14 by separating the other end of the restoration link 14 from its hinged point on the hinge arm 11 and then hinging the other end to the fixed point of the actuator 20 as shown in FIG. 5.

At this time, the one end (top end) is preferably hinged to the hinge arm 11 at a position behind the top end hinge points of the first and second links 12 and 13 hinged to the hinge arm 11.

In addition, at the time of restoration, the other end (bottom end) of the restoration link 14 is hinged to the front part of the actuator body 22 serving as the fixing point of the actuator, in which the hinged point of the other end of the restoration link 14 is preferably set to be located below and ahead of the bottom ends-hinged points of the first and second links 12 and 13.

It is possible to separate and re-fasten the other end of the restoration link 14 by pulling out a hinge pin 14a from the hinge arm 11, and then re-fastening the other end to the fixing point of the actuator 20.

Referring to FIG. 5, it can be seen that the bottom end-hinged part of the restoration link 14 is positioned lower than the bottom ends-hinged parts of the first and second links 12 and 13, and the bottom end-hinged part of the restoration link 14 is positioned ahead of the bottom end-hinged part of the second link 13 which is positioned ahead of the first link 11.

When the restoration link 14 is connected in this manner, the restoration link 14 interconnect the hinge arm 11 and the body 22 of the actuator 20 in the inclined direction, in which if the user presses the front end of the hood for restoration after the operation of the actuator 20, the hinge arm 11 is pressed downward so that the restoration link 14 can be rotated counterclockwise about the bottom end-hinged part thereof, and hence the first link 12, the second link 13 and the actuator 20 are sequentially moved and lowered in cooperation with the restoration link 14 (the first and second links are rotated counterclockwise about the bottom ends-hinged parts thereof, respectively).

Of course, since the actuator 20 is lowered by overcoming the spring force of the springs when the hood and the restoration link 14 are lowered, the springs 21 are compressed.

As the restoration link is rotated downward due to the movement of the hinge arm when the hood is lowered in this manner, the user can readily lower the hood, the actuator, the hinge arm, and the individual links with less force. The functional effects of the restoration link will be described below with reference to FIG. 6.

In the present invention, the restoration link 14 performs a lever action for reducing the restoration force to be exerted by the user. For example, assuming that the force required for compressing the springs 21 of the actuator 20, i.e. the spring force is 500 kgf, the restoration force to be exerted by the user for restoring the active hood system can be calculated as follows:

$$\Sigma M = 0 \quad (1)$$
$$F \times B + W \times A - 500 \text{ kgf} \times C = 0$$
$$\therefore F = \frac{500 \text{ kgf} \times C - W \times A}{B}$$

Herein, A is a distance from the top end-hinged part (rotation center) of the restoration link 14 to the center of gravity of the hood 1, B is a distance from the top end-hinged part of the restoration link 14 to the acting point of force (restoration force) exerted by the user, and W is a load acting due to the self-weight at the center of gravity.

In addition, C is an eccentric distance between the acting point of the spring force of the actuator and the top end-hinged part of the restoration link 14, and F is a force to be exerted by the user to the hood 1 for restoring the active hood system, i.e. a restoration force.

Assuming, as an example, that A=700 mm, B=1,100 mm, C=80 mm, and W=20 kgf in Equation 1, F will be 24 kgf, which can be easily applied to the acting point on the hood by the user. Accordingly, with the aid of the lever action of the restoration link, the positions of the springs, the actuator and the hood can be restored to the original conditions thereof even with little force.

Like this, in accordance with the present invention, if a user presses the front end of the hood of a vehicle in a state in which the actuator was operated and lifted for protecting a pedestrian at the time of a pedestrian collision, the restoration link serves as a lever, whereby the positions of the actuator and the hood can be lowered and restored with a less force.

The invention has been described in detail with reference to exemplary embodiments thereof. However, it will be appreciated by those skilled in the art that changes may be made in these embodiments without departing from the principles and spirit of the invention, the scope of which is defined in the appended claims and their equivalents.

What is claimed is:

1. An active hood system for a vehicle, comprising:
   a hinge assembly configured to be mounted at each of the left and right sides of a hood and to provide a hinge point at the time of opening or closing the hood;
   an actuator configured to support and lift the hinge assembly as well as to lift the hood through the hinge assembly; and
   a restoration link with top and bottom ends, wherein the top end of the restoration link is hinged to a hinge arm of the hinge assembly fixed to the hood, and wherein the bottom end is configured to be hinged to a fixing point of the actuator, wherein the restoration link, when the bottom end is hinged to the fixing point of the actuator, is configured to be rotated in cooperation with the hood,
   wherein when the hood is pressed downward at the time of restoring the actuator and the hood, the restoration link is rotated about its bottom end-hinged part, at which the bottom end of the restoration link is connected to the fixing point of the actuator.

2. The active hood system of claim 1, wherein the restoration link is installed to interconnect the hinge arm and the fixing point of the actuator in an inclined direction.

3. The active hood system of claim 1, wherein with reference to the front and the rear direction of the vehicle body, the restoration link is hinged to the rear end of the hinge arm at its top end, and hinged to the front fixing point of the actuator at its bottom end.

4. The active hood system as claimed in claim 3, wherein the top end of the restoration link is hinged to a position behind one or more top link ends-hinged parts of the hinge assembly for interconnecting the hinge arm and the actuator.

5. The active hood system as claimed in claim 3, wherein the bottom end of the restoration link is hinged to the body of the actuator below and ahead of one or more bottom link ends-hinged parts of the hinge assembly for interconnecting the hinge arm and the actuator.

6. A vehicle, comprising:
   a hood;
   a hinge assembly configured to be mounted at each of the left and right sides of the hood and to provide a hinge point at the time of opening or closing the hood;
   an actuator configured to support and lift the hinge assembly as well as to lift the hood through the hinge assembly; and
   a restoration link with top and bottom ends, wherein the top end of the restoration link is hinged to a hinge arm of the hinge assembly fixed to the hood, and wherein the bottom end is configured to be hinged to a fixing point of the actuator, wherein the restoration link, when the bottom end is hinged to the fixing point of the actuator, is configured to be rotated in cooperation with the hood,
   wherein when the hood is pressed downward at the time of restoring the actuator and the hood, the restoration link is rotated about its bottom end-hinged part, at which the bottom end of the restoration link is connected to the fixing point of the actuator.

7. A method for restoring an actuator and a hood of an active hood system for a vehicle, from a state where the actuator has lifted the hood through a hinge assembly mounted at each of the left and right sides of the hood and supported by the actuator, the hinge assembly to provide a hinge point at the time of opening or closing the hood, the method comprising:
   hinging a bottom end of a restoration link, with top and bottom ends, to a fixing point of the actuator, wherein the top end of the restoration link is hinged to a hinge arm of the hinge assembly fixed to the hood, and wherein the restoration link, when the bottom end is hinged to the fixing point of the actuator, is configured to be rotated in cooperation with the hood; and
   pressing the hood downward to restore the actuator and the hood, wherein the restoration link is rotated about its bottom end-hinged part, at which the bottom end of the restoration link is connected to the fixing point of the actuator.

* * * * *